United States Patent
Nakamura

(10) Patent No.: US 7,222,386 B2
(45) Date of Patent: May 29, 2007

(54) WIPER PIVOT AND VEHICLE WIPER DEVICE HAVING THE SAME

(75) Inventor: Yoshinori Nakamura, Toyohashi (JP)

(73) Assignee: Asmo Co., Ltd., Shizuoka-Pref. (JP)

( * ) Notice: Subject to any disclaimer, the term of this patent is extended or adjusted under 35 U.S.C. 154(b) by 611 days.

(21) Appl. No.: 10/636,575

(22) Filed: Aug. 8, 2003

(65) Prior Publication Data

US 2004/0034959 A1 Feb. 26, 2004

(30) Foreign Application Priority Data

Aug. 22, 2002 (JP) .............................. 2002-242428

(51) Int. Cl.
B60S 1/06 (2006.01)
B60S 1/34 (2006.01)

(52) U.S. Cl. .................... 15/250.31; 15/250.3

(58) Field of Classification Search .............. 15/250.3, 15/250.31, 250.34, 250.27; 277/634, 637, 277/644, 650; 296/96.15, 96.17
See application file for complete search history.

(56) References Cited

U.S. PATENT DOCUMENTS 5,675,862 A * 10/1997 Reinl ....................... 15/250.31
6,254,167 B1 * 7/2001 Goto et al. .............. 296/96.15
6,318,735 B1 * 11/2001 Lambeth ..................... 277/634

FOREIGN PATENT DOCUMENTS

| JP | U-H04-51854 | 4/1992 |
| JP | U-6-25063 | 4/1994 |
| JP | 2000-71941 | * 3/2000 |
| JP | A-2000-85541 | 3/2000 |
| JP | A-2002-127874 | 5/2002 |

OTHER PUBLICATIONS

Notification of Reason(s) for Refusal from Japanese Patent Office issued on Nov. 27, 2006 for the corresponding Japanese patent application No. 2002-242428 (a copy and English translation thereof).

* cited by examiner

Primary Examiner—Gary K. Graham
(74) Attorney, Agent, or Firm—Posz Law Group, PLC

(57) ABSTRACT

A pivot holder includes a tubular main body, which rotatably supports a pivot shaft therein, and a securing portion, which is integrally formed with the main body and extends from an outer peripheral surface of the main body, and a plurality of engaging grooves. A water shield cap includes a tubular portion, which is fitted to the outer peripheral surface of the main body of the pivot holder, a water receiver, which extends radially outward from the tubular portion, and a plurality of engaging projections. The engaging projections of the water shield cap are engaged with the engaging grooves of the pivot holder to limit axial movement and rotational movement of the water shield cap relative to the pivot holder.

16 Claims, 6 Drawing Sheets

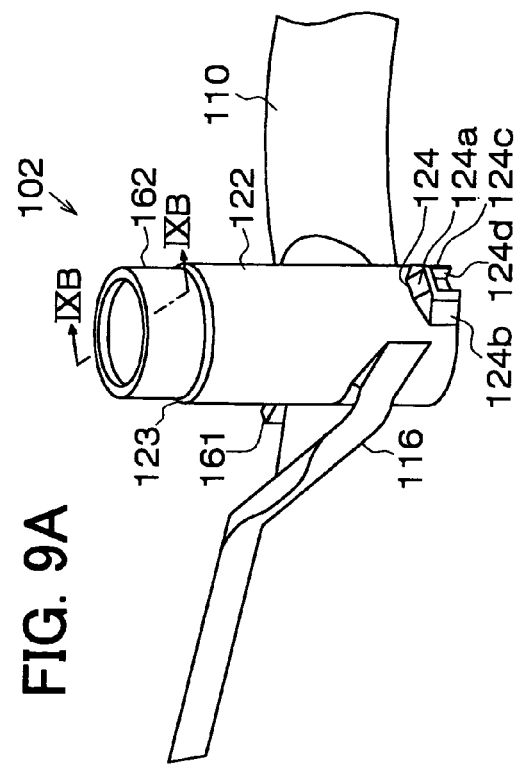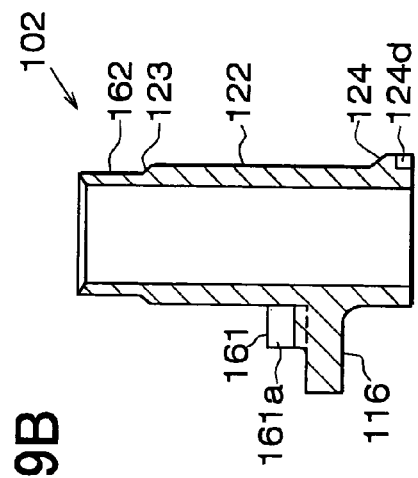
FIG. 8A
FIG. 9A
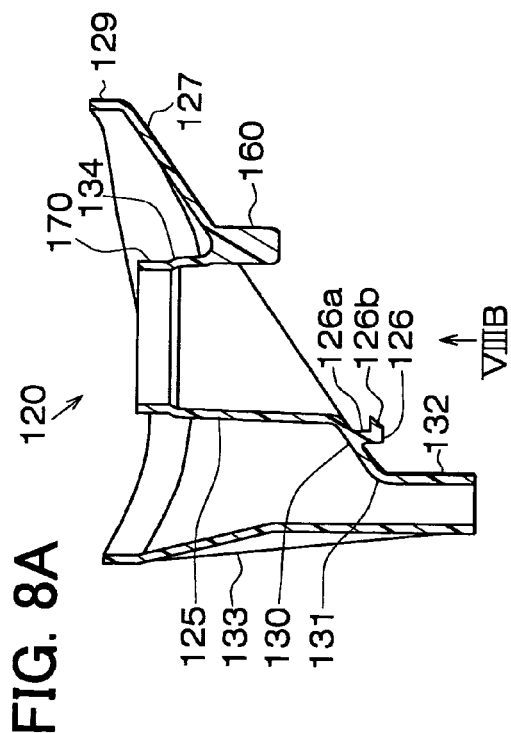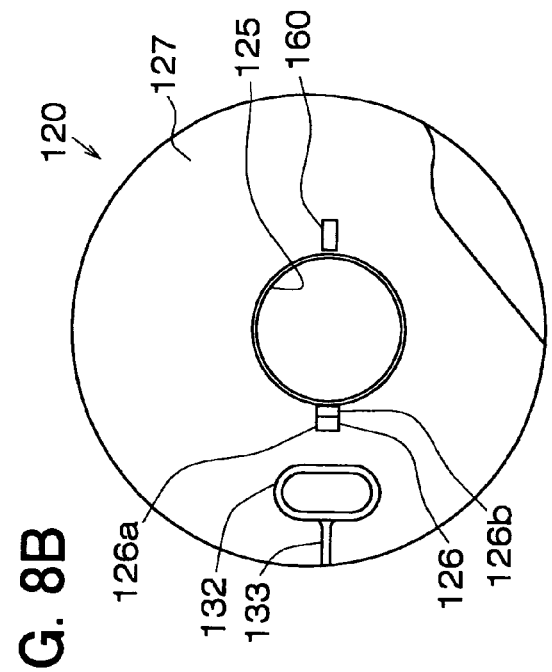
FIG. 8B
FIG. 9B

WIPER PIVOT AND VEHICLE WIPER DEVICE HAVING THE SAME

CROSS REFERENCE TO RELATED APPLICATION

This application is based on and incorporates herein by reference Japanese Patent Application No. 2002-242428 filed on Aug. 22, 2002.

BACKGROUND OF THE INVENTION

1. Field of the Invention

The present invention relates to a wiper pivot and a vehicle wiper device having the same.

2. Description of Related Art

A wiper pivot of a vehicle wiper device is arranged in such a manner that a pivot shaft rotatably supported by a pivot holder projects outwardly through a corresponding pivot hole formed through a plate (e.g., a cowl top panel) of a vehicle.

In such a wiper pivot, at the time of car wash or of rain, water enters through the pivot hole. When the water falls onto a wiper motor or a connection (e.g., a ball joint) of a link mechanism that drives the pivot shaft of the wiper pivot, it may cause an electrical trouble of the wiper motor or grease shortage of the connection of the link mechanism. Thus, in order to prevent such a trouble induced by the water applied through the pivot hole, a rubber pivot cap (also referred to as a water shield cap) is provided to the pivot holder.

The rubber pivot cap includes a tubular portion, an annular water receiver, a drain hole formed in the water receiver and a tubular drain pipe that extends axially downward from the drain hole. The tubular portion includes a plurality of annular projections in its inner peripheral surface. The pivot holder is press fitted into the tubular portion. At this time, the annular projections are tightly engaged with an outer peripheral surface of the pivot holder due to resilient force of the rubber, so that the tubular portion is secured to the pivot holder. The water receiver acts like an umbrella and extends radially outward from one end (i.e., a pivot hole side end) of the tubular portion. A size of the water receiver is larger than that of the pivot hole. Furthermore, the water receiver covers an opening side end surface of the pivot holder. The drain hole extends through the water receiver. The drain hole is formed on one side of the water receiver, which is opposite from the connection of the link mechanism. The tubular drain pipe extends axially downward from the drain hole of the water receiver. The drain pipe is arranged between ribs, which extend from the pivot holder.

In the above pivot cap, water entered through the pivot hole is received by the water receiver and is drained from the drain hole of the water receiver to the lower side of the pivot cap through the drain pipe. That is, intrusion of water between the pivot holder and the pivot cap and application of water to the connection of the link mechanism are restrained. Furthermore, the provision of the drain pipe between the ribs of the pivot holder limits rotation of the pivot cap relative to the pivot holder.

However, since the pivot cap is made of the rubber material, manufacturing costs of the rubber pivot cap are relatively high in comparison to a resin pivot cap. Furthermore, because of the rubber material, a wall thickness of the water receiver needs to be increased to maintain the shape of the water receiver, resulting in a further increase in the manufacturing costs.

To address the above disadvantages, it is conceivable to manufacture the pivot cap from a resin material. In the above case, the rubber pivot cap can be tightly secured to the pivot holder by the surface pressure of the tubular portion. However, resiliency of the resin material is smaller than that of the rubber material. Thus, when the pivot cap is made of the resin material, the securing force for securing the resin pivot cap and the pivot holder together is disadvantageously reduced. For example, such a resin pivot cap may be installed to a module type wiper device, in which components, such as a wiper motor and a link mechanism, are preassembled to serve as a module. When this module type wiper device is transported, the resin pivot cap can be relatively easily displaced from its predetermined securing position upon application of vibrations or shocks induced during the transportation. This causes improper assembly of the module type wiper device.

SUMMARY OF THE INVENTION

The present invention addresses the above disadvantages. Thus, it is an objective of the present invention to provide an improved wiper pivot having a water shield cap secured to a pivot holder. It is another objective of the present invention to provide a wiper device having such a wiper pivot.

To achieve the objectives of the present invention, there is provided a wiper pivot for a wiper device of a vehicle, which includes at least one wiper. The wiper pivot includes a pivot shaft, a pivot holder and a water shield cap. The pivot shaft extends through a pivot hole provided in a body of the vehicle and is connected with a corresponding one of the at least one wiper. The pivot holder includes a tubular main body, a securing portion and at least one holder side engaging portion. The tubular main body rotatably supports the pivot shaft therein. The securing portion is integrally formed with the main body and extends from an outer peripheral surface of the main body. The securing portion is secured to the body of the vehicle. The water shield cap includes a tubular portion, a water receiver and at least one cap side engaging portion. The tubular portion is fitted to the outer peripheral surface of the main body of the pivot holder in an axial direction of the pivot shaft. The water receiver extends radially outward from the tubular portion. Each of the at least one cap side engaging portion is engaged with a corresponding one of the at least one holder side engaging portion. When at least one of the at least one cap side engaging portion is engaged with the corresponding one of the at least one holder side engaging portion, axial movement of the water shield cap relative to the pivot holder is limited.

To achieve the objectives of the present invention, there is also provided a wiper device for a vehicle. The wiper device includes a wiper motor, a link mechanism, at least one wiper and at least one wiper pivot of the above described type. The link mechanism is connected to the wiper motor. The at least one wiper is driven by the wiper motor through the link mechanism. Each of the at least one wiper pivot is placed between the link mechanism and a corresponding one of the at least one wiper to rotatably support the corresponding one of the at least one wiper.

BRIEF DESCRIPTION OF THE DRAWINGS

The invention, together with additional objectives, features and advantages thereof, will be best understood from the following description, the appended claims and the accompanying drawings in which:

FIG. 8A is a cross sectional view of a water shield cap of the wiper pivot of the third embodiment;

FIG. 8B is a bottom view of the water shield cap seen in a direction of an arrow VIIIB in FIG. 8A;

FIG. 9A is a partial perspective view of a pivot holder of the wiper pivot of the third embodiment; and FIG. 9B is a cross sectional view along line IXB—IXB in FIG. 9A;

DETAILED DESCRIPTION OF THE INVENTION

First Embodiment

A first embodiment of the present invention will be described with reference to the accompanying drawings.

Figure 1:
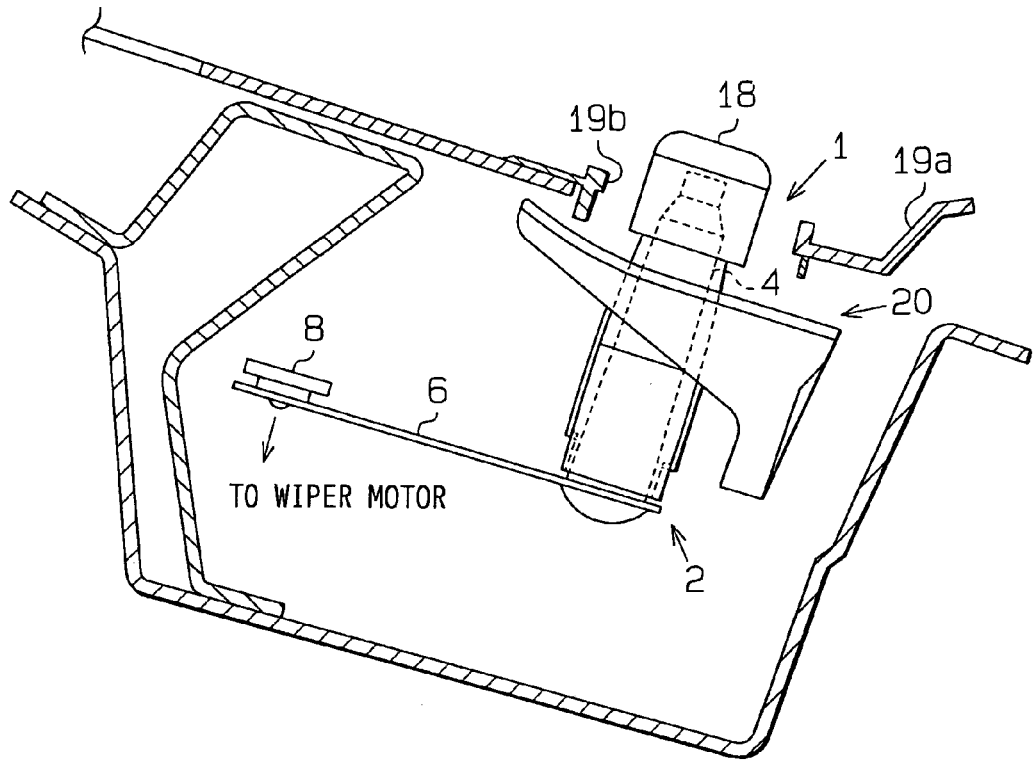
FIG. 1 is a schematic view showing a module type wiper device according to a first embodiment of the present invention.
Figure 2:
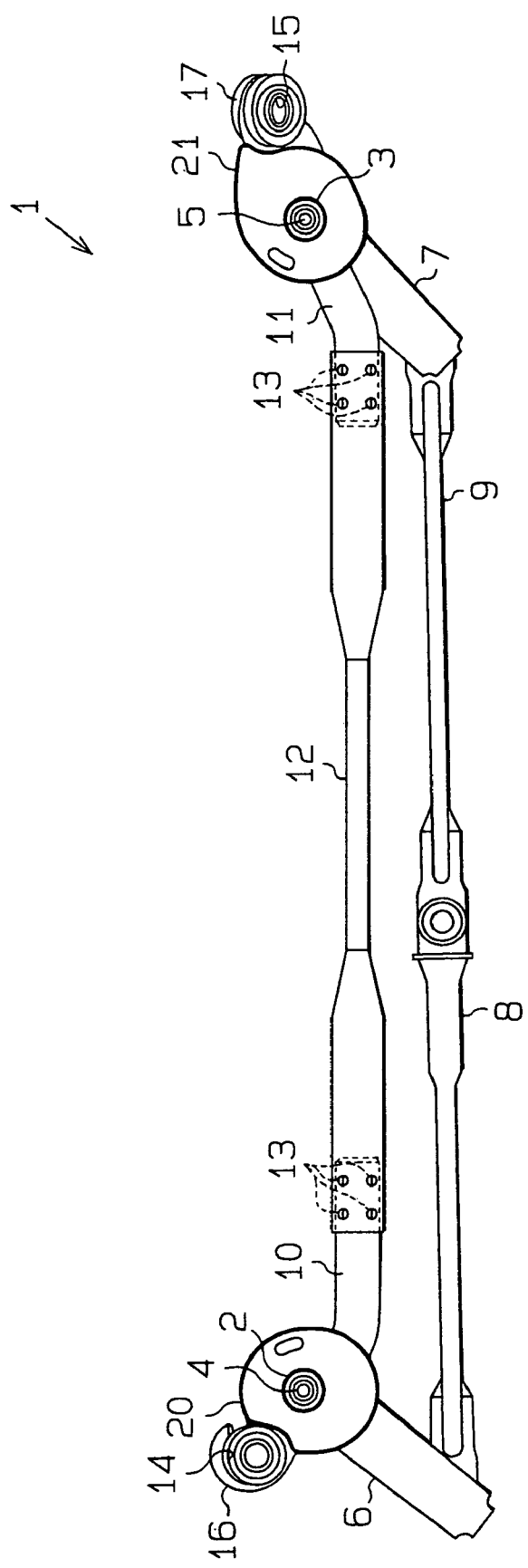
FIG. 2 is a plan view of the module type wiper device.

With reference to FIGS. 1 and 2, a module type wiper device 1 according to the first embodiment includes two pivot holders 2, 3. Each pivot holder 2, 3 has a substantially identical basic structure and is shaped into a generally cylindrical form to rotatably support a corresponding pivot shaft 4, 5, for example by plain bearings. A base end of a corresponding link lever 6, 7 is secured to a lower end of the pivot shaft 4, 5. One end of a corresponding link rod 8, 9 is rotatably supported by a distal end of the link lever 6, 7, and the other end of the link rod 8, 9 is rotatably connected to one end of a crank arm (not shown), which is secured to an output shaft of a wiper motor (not shown). Thus, when the output shaft of the wiper motor is rotated, each link lever 6, 7 is swung through the crank arm and the corresponding link rod 8, 9, so that each pivot shaft 4, 5 is rotated within a predetermined angular range. Here, each link lever 6, 7, the crank arm and the corresponding link rod 8, 9 cooperate together to serve as a link mechanism, which links between the wiper motor and the pivot shafts 4, 5. Through the reciprocal rotation of the pivot shaft 4, 5, each wiper connected to a distal end of the corresponding pivot shaft 4, 5 is reciprocally swung to wipe a window glass surface, such as a windshield surface.

Each pivot holder 2, 3 is made of a metal material and has a frame joint 10, 11, which is connected to a metal pipe frame 12. During assembly, each frame joint 10, 11 is inserted into the pipe frame 12. Then, external pressure is applied to the pipe frame 12 to deform the pipe frame 12 against the frame joint 10, 11, so that the pipe frame 12 is joined with the frame joint 10, 11. More specifically, each frame joint 10, 11 includes a plurality of engaging recesses 13. Opposed portions of the pipe frame 12, which are opposed to the engaging recesses 13 of the frame joint 10, 11, are pressed and are deformed against the engaging recesses 13 to join therebetween. In this way, the pivot holders 2, 3 are secured to the ends of the pipe frame 12. Furthermore, each pivot holder 2, 3 includes a securing portion 16, 17, which has a securing hole 14, 15. The module type wiper device 1 is secured to a vehicle body by fixation bolts (not shown), each of which is inserted through the corresponding securing hole 14, 15 and is threadably engaged with the vehicle body. As shown in FIG. 1, two pivot holes 19b are provided in a cowl top panel 19a of the vehicle body. The pivot shaft 4 is arranged such that a distal end of the pivot shaft 4 protrudes through a corresponding one of the pivot holes 19b, and a base end of a corresponding one of two wipers 18 is securely connected to the distal end of the pivot shaft 4. Although not illustrated, the pivot shaft 5 is arranged in a manner similar to that of the pivot shaft 4, and a base end of a corresponding one of the wipers 18 is securely connected to the distal end of the pivot shaft 5.

A water shield cap 20, 21 is attached to each pivot holder 2, 3. Similar to the pivot holders 2, 3, each of the water shield caps 20, 21 has a generally identical basic structure. Thus, only the pivot holder 2 and the corresponding water shield cap 20 will be described with reference to the drawings, and description and illustration of the pivot holder 3 and the corresponding water shield cap 21 will be omitted for the sake of simplicity.

Figure 3A:
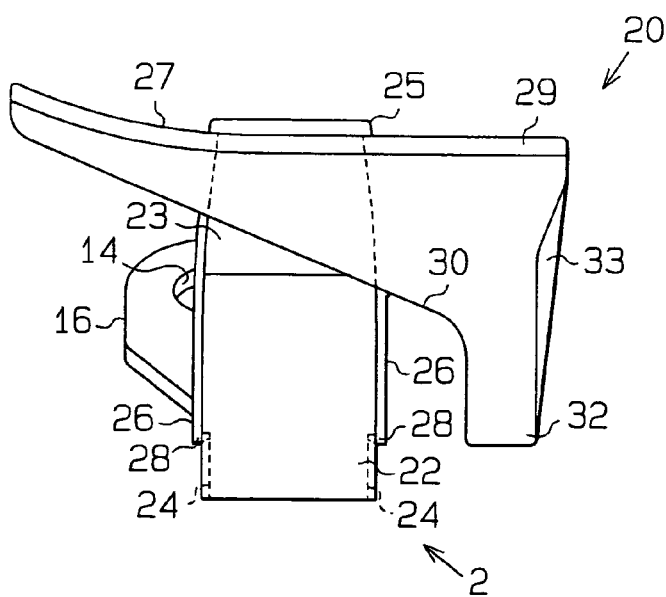
FIG. 3A is a partially enlarged side view showing a water shield cap and a pivot holder engaged one another.
Figure 3B:
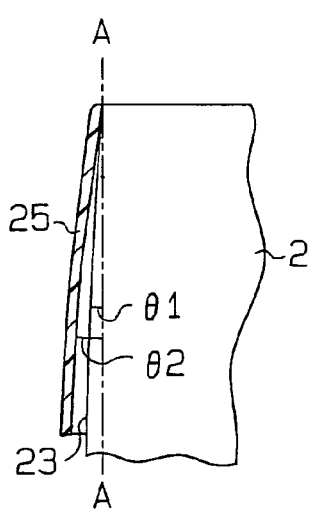
FIG. 3B is a descriptive partial view showing engagement between a tapered portion of the pivot holder and a tubular portion of the water shield cap.

As shown in FIGS. 3A and 3B, the pivot holder 2 includes a tubular main body 22. The main body 22 includes a tapered portion 23, which is located at a distal end of the main body 22 and is tapered toward the distal end of the main body 22 (i.e., toward the pivot hole 19b). The tapered portion 23 is angled at an angle θ1 with respect to an axial line A of FIG. 3B, which is generally parallel to a central axis of the pivot holder 2. A plurality (two in this embodiment) of engaging grooves (also referred to as engaging recesses) 24, which serve as holder side engaging portions, is formed in a lower end of an outer peripheral surface of the main body 22. Each engaging groove 24 extends from a predetermined axial point of the outer peripheral surface of the main body 22 to the lower end of the main body 22. That is, each engaging groove 24 is formed as a generally rectangular groove, which extends in the axial direction and has a closed stop end (top side end in FIG. 3A). Furthermore, the engaging grooves 24 are circumferentially arranged in predetermined positions of the pivot holder 2 (positions other than those axially aligned with the securing portion 16 or the frame joint 10). Furthermore, in the pivot holder 2, the securing portion 16 in a plate form and the frame joint 10 (not shown in FIGS. 3A and 3B) in a tubular form are formed integrally with the main body 22.

Next, details of the water shield cap 20 will be described.

Figure 4:
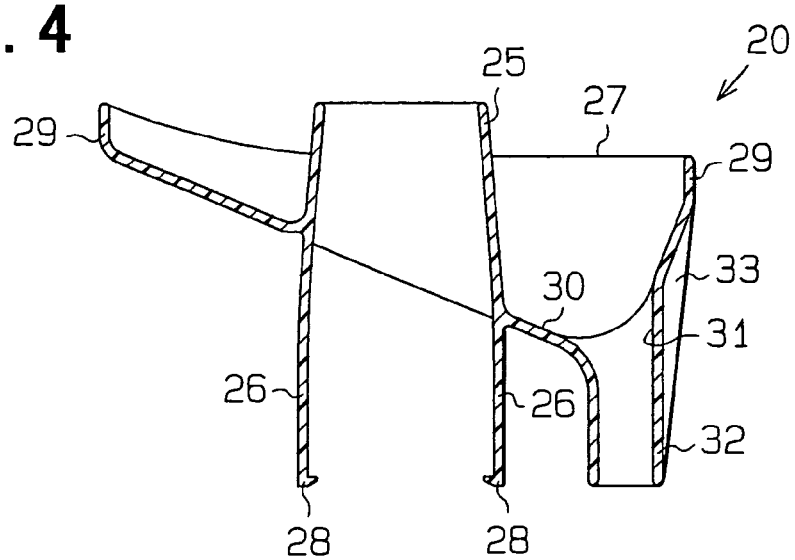
FIG. 4 is a cross sectional view of the water shield cap.

With reference to FIGS. 3A–4, the water shield cap 20 is made of a colored resin material (e.g., a resin material colored black or color that coincides with color of the vehicle body) and has a tubular portion 25. The tubular portion 25 receives the pivot holder 2. An inner peripheral surface of the tubular portion 25 is tapered at an angle θ2 with respect to the axial line A in FIG. 3B and is engaged with the tapered portion 23 of the pivot holder 2. That is, in comparison to the tapered portion 23 of the pivot holder 2, the tubular portion 25 is angled at the slightly greater angle relative to the axial line A (i.e., θ1<θ2 ). In other words, at the engaging point, at which the pivot holder 2 and the water shield cap 20 are engaged one another, an outer diameter of the tapered portion 23 generally coincides with an inner diameter of the tubular portion 25. Furthermore, a plurality (two in this embodiment) of base sections 26, which extend axially downward (i.e., extend on one side of the tubular portion 25, which is opposite from the pivot hole 19b), is formed in the tubular portion 25. Also, an umbrella-like water receiver 27 is formed integrally in the outer peripheral surface of the tubular portion 25 to extend radially outward from the tubular portion 25.

Each base section 26 is formed at a position that corresponds to a corresponding one of the engaging grooves 24 of the pivot holder 2 along an outer peripheral edge of the tubular portion 25. An engaging projection 28, which is bent to extend radially inward, is formed in a free end of each base section 26 to serve as a cap side engaging portion in cooperation with the base section 26. Each projection 28 is engaged with a corresponding one of the engaging grooves 24 of the pivot holder 2. A length of each base section 26 is set to achieve the engagement between the projection 28 and the corresponding engaging groove 24 when the tubular portion 25 is engaged with the tapered portion 23 of the pivot holder 2. In other words, the length of each base section 26 is set to cause an inner peripheral surface of the distal end of the tubular portion 25 to tightly engage with the outer peripheral surface of the tapered portion 23 with a predetermined engaging force when the projections 28 are engaged with the corresponding engaging grooves 24.

The water receiver 27 has a generally circular cross section, which has a radius greater than that of the corresponding pivot hole 19b, and is placed adjacent to the pivot hole 19b. A peripheral wall 29 is integrally formed along an outer peripheral edge of the water receiver 27. The peripheral wall 29 projects axially upward (i.e., toward the corresponding pivot hole 19b) with respect to the water receiver 27. Furthermore, the water receiver 27 includes an inclined wall 30, which is inclined downward from the outer peripheral edge of the water receiver 27.

A drain hole 31 is opened at a lower apex of the inclined wall 30 of the water receiver 27. A drain pipe 32 is integrally formed with the water receiver 27 to surround the drain hole 31 and extends axially downward (i.e., away from the pivot hole 19b). A reinforcing rib 33 axially extends along an outer peripheral surface of the drain pipe 32. The rib 33 adds rigidity to the drain pipe 32.

Next, effects of the water shield cap 20 will be described.

The pivot holder 2 is received in the tubular portion 25 of the water shield cap 20. Thus, the tapered portion 23 of the pivot holder 2 is generally fluid tightly engaged with the inner peripheral surface of the water shield cap 20 (particularly, with the inner surface of the distal end of the water shield cap 20). When the pivot holder 2 is tightly engaged with the water shield cap 20, effective sealing between the water shield cap 20 and the pivot holder 2 is achieved, and the axially downward movement of the water shield cap 20 relative to the pivot holder 2 is limited.

Furthermore, at this time, the projections 28 of the base sections 26 are engaged with the corresponding engaging grooves 24 of the pivot holder 2. Through this engagement, movements of the water shield cap 20 in the axially upward direction and in the circumferential direction are restrained. In the present embodiment, each pivot shaft 4, 5, the corresponding pivot holder 2, 3 and the corresponding water shield cap 20, 21 constitute a wiper pivot of the wiper system.

The present embodiment provides the following advantages.

(1) The water shield cap 20 includes the tubular portion 25, the projections 28 provided in the free ends of the base sections 26, and the tubular portion 25 and the projections 28 are engaged with the tapered portion 23 and the engaging grooves 24, respectively, of the pivot holder 2. Thus, the water shield cap 20 can be secured to the pivot holder 2 in a manner that limits the axial movement of the water shield cap 20.

(2) The water shield cap 20 includes the projections 28, which are engaged with the engaging grooves 24 of the pivot holder 2. Thus, it is possible to limit rotation of the water shield cap 20 with respect to the pivot holder 2.

(3) The water shield cap 20 includes the tubular portion 25, which has the tapered surface that is angled relative to the axial line at the angle greater than that of the tapered portion 23 of the pivot holder 2. Furthermore, the tubular portion 25 is engaged with the tapered portion 23 of the pivot holder 2 along its entire perimeter. That is, when the projections 28 of the water shield cap 20 are engaged with the engaging grooves 24 of the pivot holder 2, the outer diameter of the tapered portion 23 substantially coincides with the inner diameter of the tubular portion 25 at the point where the pivot holder 2 and the water shield cap 20 are engaged one another, so that the pivot holder 2 and the water shield cap 20 achieve the tight engagement therebetween. Thus, the sealing between the water shield cap 20 and the pivot holder 2 is improved.

(4) The water shield cap 20 is made of the resin material. Thus, in comparison to the water shield cap made of the rubber material, manufacturing costs can be reduced.

(5) The water shield cap 20 is made of the resin material colored, for example, black or the vehicle body color. Thus, when the water shield cap 20 is seen from the outside through the pivot hole 19b, the color of the water shield cap 20 matches with its surrounding, resulting in an improved appearance of the water shield cap 20.

(6) The rib 33 is formed along the outer peripheral surface of the drain pipe 32. Thus, the rigidity of the drain pipe 32 is improved. As a result, it is possible to restrain deformation and size reduction of the drain hole 31 of the drain pipe 32. Therefore, the water can be effectively drained through the drain pipe 32.

Second Embodiment

A second embodiment of the present invention will be described with reference to the accompanying drawings. The second embodiment is similar to the first embodiment except shapes of the pivot holders 2, 3 and of the water shield caps 20, 21, and thus components similar to those discussed with reference to the first embodiment will be indicated by the same numerals and will not be described further for the sake of simplicity. The module type wiper device 1 includes two generally identical pivot holders and two generally identical water shield caps. Thus, only the pivot holder 40 and the water shield cap 41 will be described with reference to the accompanying drawings, and the other one pivot holder and the other one water shield cap will not be described for the sake of simplicity.

Figure 5A:
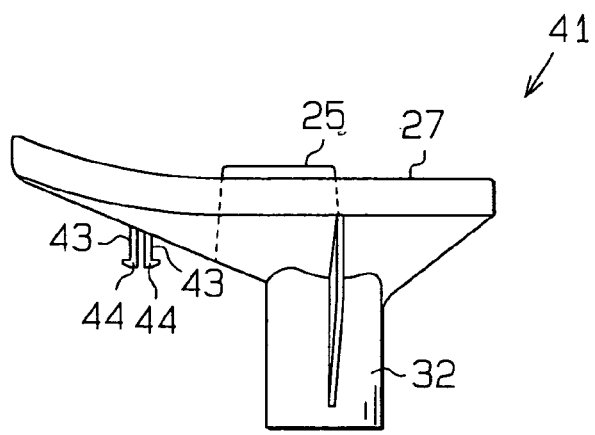
FIG. 5A is a side view of a water shield cap according to a second embodiment of the present invention.
Figure 5B:
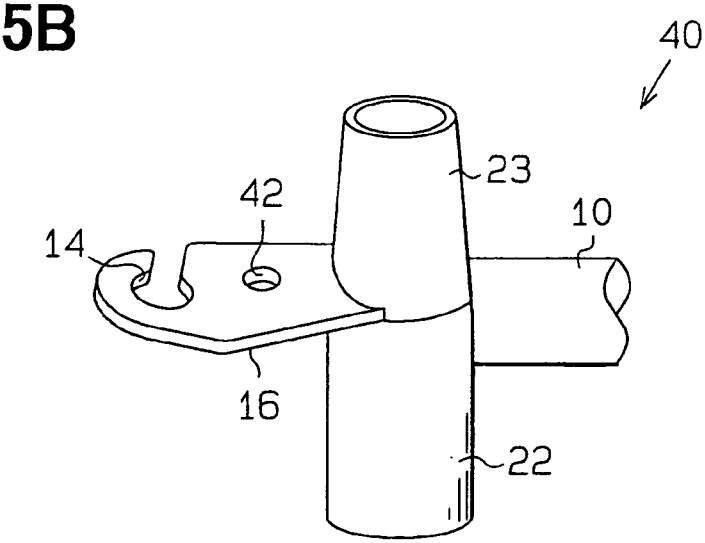
FIG. 5B is a perspective view of a pivot holder according to the second embodiment.

FIG. 5A shows the water shield cap 41, and FIG. 5B shows the pivot holder 40 to be engaged with the water shield cap 41. The pivot holder 40 includes the tubular main body 22. The main body 22 includes the tapered portion 23, which is located at the distal end of the tubular main body 22 and is tapered toward its distal end. The radially outwardly extending securing portion 16 in the plate form and the tubular frame joint 10 are integrally formed generally at the axial center of the pivot holder 40.

The securing portion 16 includes the securing hole 14, which receives the bolt (not shown), and an engaging through hole (serving as a holder side engaging portion) 42, which extends axially through the securing portion 16. The securing hole 14 is located in a distal end of the securing portion 16. The through hole 42 is formed in a predetermined position (position where it does not interfere with the undepicted bolt received in the securing hole 14) of the securing portion 16 and has a circular cross section. The through hole 42 receives a couple of base sections 43, which will be described in greater detail. An inner diameter of the through hole 42 is set such that an inner peripheral edge of the through hole 42 is engaged with an outer peripheral edge of each base section 43 when the base sections 43 are inserted into the through hole 42.

Next, the water shield cap 41 will be described in greater detail.

The water shield cap 41 includes the tubular portion 25, the water receiver 27 and the tubular drain pipe 32. The water receiver 27 extends radially outward from the tubular portion 25, and the drain pipe 32 extends axially downward (away from the pivot hole 19b) from the drain hole 31 (not shown in FIG. 5) of the water receiver 27. The pair of base sections 43 is integrally formed in a back surface of the water receiver 27 and extends axially downward.

The pair of base sections 43 is formed in a predetermined position in the back surface of the water shield cap 41, which corresponds to the position of the through hole 42 of the securing portion 16. Furthermore, the pair of base sections 43 have a length, which allows protrusion of the base sections 43 from the through hole 42 when the inner peripheral surface of the tubular portion 25 of the water shield cap 41 is axially engaged with the pivot holder 40. Each of the base sections 43 has a generally semicircular cross section when it is seen in the axial direction. A free end of each base section 43 has a projection 44, which projects along a lower surface of the securing portion 16. Here, the base section 43 and the projection 44 serve as a cap side engaging portion. The projections 44 extend in opposite directions, respectively, and are engaged with the through hole 42 (specifically, with a part of the securing portion 16 located around the peripheral edge of the through hole 42). The base sections 43 are spaced from one another by a predetermined distance to allow inward flexure of the base sections 43 when the projections 44 are inserted through the through hole 42 (i.e., the base sections 43 are spaced by a predetermined distance that allows insertion of the projections 44 into the through hole 44 upon the flexure of the base sections 43). Also, it should be noted that each base section 43 and the corresponding projection 44 can be regarded as a single projection, which is engaged with the through hole 42.

Next, effects of the water shield cap 41 will be described.

The pivot holder 40 is received in the tubular portion 25 of the water shield cap 41. Then, the tapered portion 23 of the pivot holder 40 is tightly engaged with the inner peripheral surface of the water shield cap 41 (particularly, with the inner peripheral surface of the distal end of the water shield cap 41). When the pivot holder 40 is tightly engaged with the water shield cap 41, effective sealing between the water shield cap 41 and the pivot holder 40 is achieved, and axially downward movement of the water shield cap 41 relative to the pivot holder 40 is limited.

Furthermore, at this time, the projections 44 of the base sections 43 are engaged with the through hole 42 of the pivot holder 40. Through this engagement, movements of the water shield cap 41 in the axial direction and in the circumferential direction are restrained.

In addition to the advantages of the first embodiment, the second embodiment provides the following advantages.

(1) The pair of base sections 43, each of which has the projection 44 at its distal end, is formed in the back surface of the water receiver 27 of the water shield cap 41. The base sections 43 are received through the through hole 42, and the projections 44 are engaged with the through hole 42 (specifically, with the peripheral edge of the through hole 42 of the securing portion 16). Manufacturing of such a through hole (serving as the holder side engaging portion) 42 and such projections (serving as the cap side engaging portions) 44 is relatively easy.

Third Embodiment

A third embodiment of the present invention will be described with reference to FIGS. 6–9B. The third embodiment is similar to the first embodiment except the structures of the pivot holder and of the water shield cap, so that components similar to those of the first embodiment will be indicated by the same numerals.

In the present embodiment, a front passenger seat side wiper pivot, which corresponds to one located on the right side in FIG. 2, will be described. Since the basic structure of a driver seat side wiper pivot, which corresponds to one located on the right side in FIG. 2, is similar to that of the front passenger seat side wiper pivot, the structure of the driver seat side wiper pivot will not be described for the sake of simplicity. The passenger seat side wiper pivot includes the pivot shaft 5, a pivot holder 102 and a water shield cap 120. As discussed above with reference to the first embodiment, the pivot shaft 5 extends through the pivot hole 19b (FIG. 1) of the body of the vehicle and is connected to the corresponding one of the wipers 18 (FIG. 1).

With reference to FIGS. 6–8B, the water shield cap 120 will be described in greater detail. The water shield cap 120 is made of a colored resin material (e.g., a resin material colored black or color that coincides with color of the vehicle body) and includes a tubular portion 125, a water receiver 127, a first cap side engaging portion 126, a second cap side engaging portion 160, a drain pipe 132 and a reinforcing rib 133.

The tubular portion 125 includes a shoulder 134 and a small diameter portion 170. The small diameter portion 170 is located in a distal end (i.e., a top end in FIG. 8A) of the tubular portion 125 and is separated from the rest of tubular portion 125 by the shoulder 134. A lower part of the tubular portion 125, which is located below the shoulder 134, is slightly tapered toward the distal end of the tubular portion 125.

The water receiver 127 is integrally formed with the tubular portion 125 and extends radially outward from the tubular portion 125. Furthermore, the water receiver 127 includes an inclined wall 130 and a peripheral wall 129, which extends from the inclined wall 130 toward the pivot hole 19b generally in the vertical direction. A drain hole 131 is formed in a bottom part of the inclined wall 130 and is communicated with the drain pipe 132, so that water collected by an inner surface of the inclined wall 130 is drained through the drain pipe 132. The rib 133 axially extends along an outer peripheral surface of the inclined wall 130 and an outer peripheral surface of the drain pipe 132. The rib 133 adds rigidity to the drain pipe 132.

The first cap side engaging portion 126 includes a base section 126a and a projection 126b. The base section 126a extends from the bottom of the water receiver 127 generally in the axial direction of the pivot shaft 5. The projection 126b projects radially inward from a free end (i.e., a lower end in FIG. 8A) of the base section 126a.

The second cap side engaging portion 160 projects from the water receiver 127 away from the pivot hole 19b in a direction generally parallel to the axial direction of the pivot shaft 5.

Next, with reference to FIGS. 6–7, 9A and 9B, the pivot holder 102 will be described in greater detail. The pivot holder 102 is made of a metal material and includes a tubular main body 122, a frame joint 110, a securing portion 116, a first holder side engaging portion 124 and a second holder side engaging portion 161.

The main body 122 rotatably supports the pivot shaft 5 therein by a pair of plain bearings 163 (FIG. 6), each of which is shaped into an annular form that extends along an inner peripheral surface of the main body 122. Furthermore, the main body 122 includes a shoulder 123 and a small diameter portion 162. The small diameter portion 162 is located in a distal end (i.e., a top end in FIG. 9A) of the main body 122 and is separated from the rest of the main body 122 by the shoulder 123. The frame joint 110 is integrally formed with the main body 122 and is connected to the metal pipe frame 12 (FIG. 2) through engagements at engaging recesses 113 in a manner similar to that of the frame joint 10 of the first embodiment. The securing portion 116 is integrally formed with the main body 122 and extends from an outer peripheral surface of the main body 122. Furthermore, the securing portion 116 is secured to the body of the vehicle in a manner similar to that of the securing portion 16 of the first embodiment with a structure similar to that of the securing portion 16.

The first holder side engaging portion 124 includes a pivot holder side wall 124a, a first lateral wall 124b and a second lateral wall 124c, which cooperate together to define an engaging recess 124d. The pivot holder side wall 124a is positioned on a pivot holder side of the engaging recess 124d and has a slanted external surface, which is slanted in a direction away from the distal end (i.e., the top end in FIG. 9A) of the tubular main body 122.

The second holder side engaging portion 161 includes first and second projecting walls 161a, 161b (FIG. 7), which are generally parallel to one another and project in a direction generally parallel to the axial direction of the pivot shaft 5.

Figure 6:
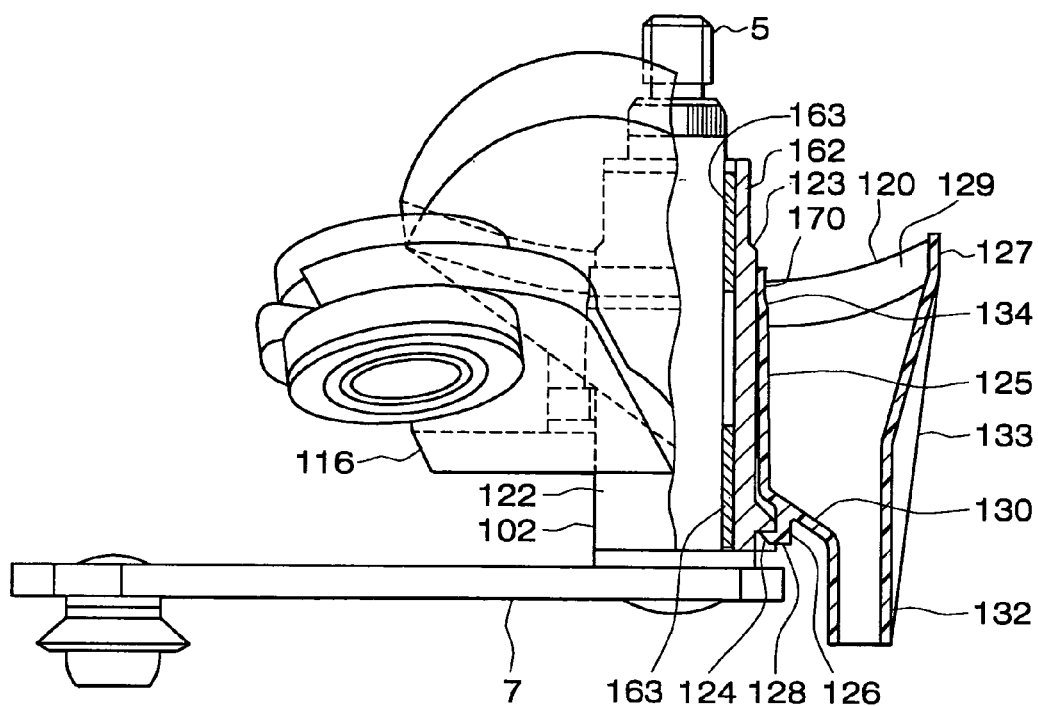
FIG. 6 is a partially cut away front view showing a front passenger seat side wiper pivot of a module type wiper device according to a third embodiment of the present invention.
Figure 7:
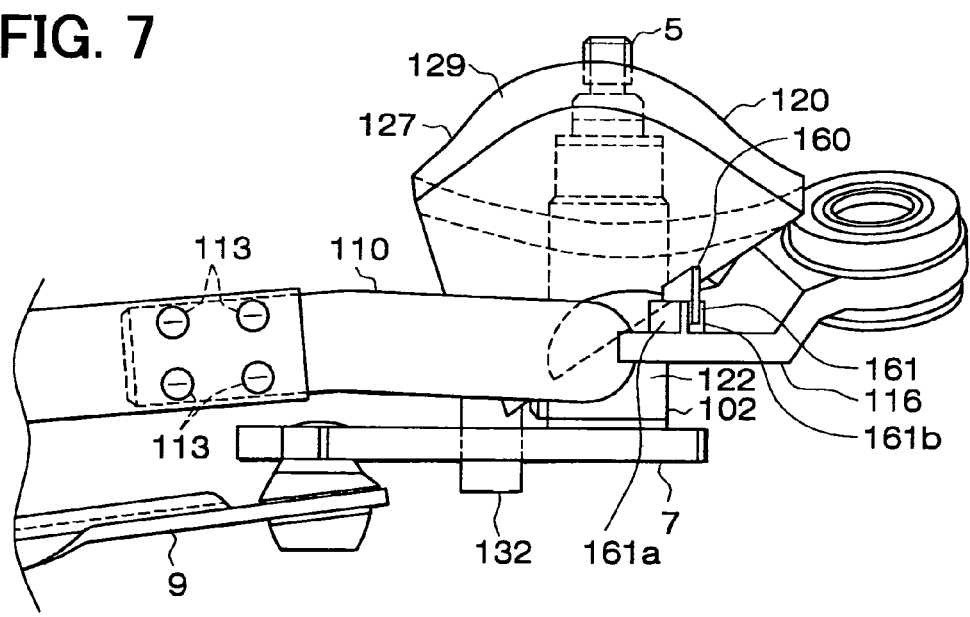
FIG. 7 is a partial rear view showing the front passenger seat side wiper pivot of the module type wiper device according to the third embodiment.

As shown in FIGS. 6 and 7, at the time of installing the water shield cap 120 to the pivot holder 102 in the axial direction, the tubular portion 125 of the water shield cap 120 receives the tubular main body 122 of the pivot holder 102 in such a manner that the small diameter portion 170 of the tubular portion 125 is tightly engaged with the main body 122 of the pivot holder 102 to restrain intrusion of water through a space between the tubular portion 125 and the main body 122. The projection 126b of the first cap side engaging portion 126 is engaged with the engaging recess 124d of the first holder side engaging portion 124 to limit axial movement and rotational movement of the water shield cap 120 relative to the pivot holder 102 upon installation of the water shield cap 120 to the pivot holder 102. The slanted external surface of the pivot holder side wall 124a of the pivot holder 102 allows smooth engagement of the projection 126b of the first cap side engaging portion 126 to the engaging recess 124d of the pivot holder 102 at the time of installing the water shield cap 120 to the pivot holder 102. Furthermore, the second cap side engaging portion 160 of the water shield cap 120 is axially received between the first projecting wall 161a and the second projecting wall 161b of the second holder side engaging portion 161 of the pivot holder 102 to further limit the rotational movement of the water shield cap 120 relative to the pivot holder 102.

As described above, according to the third embodiment, the axial movement and rotational movement of the water shield cap 120 relative to the pivot holder 102 are advantageously limited through the engagement between the first holder side engaging portion 124 and the first cap side engaging portion 126 and also through engagement between the second holder side engaging portion 161 and the second cap side engaging portion 160 while achieving the effective sealing between the water shield cap 120 and the pivot holder 102.

The above embodiments can be modified as follows.

Figure 10A:
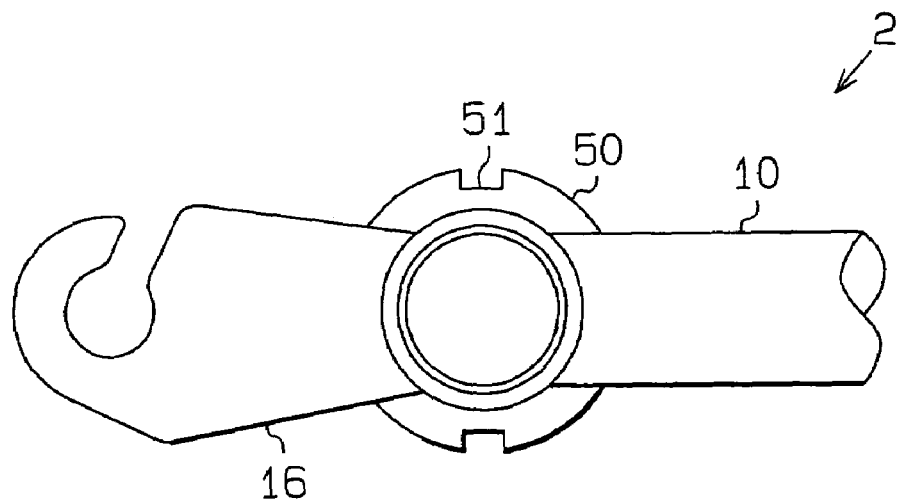
FIG. 10A is a plan view showing a modification of the pivot holder of the first embodiment.
Figure 10B:
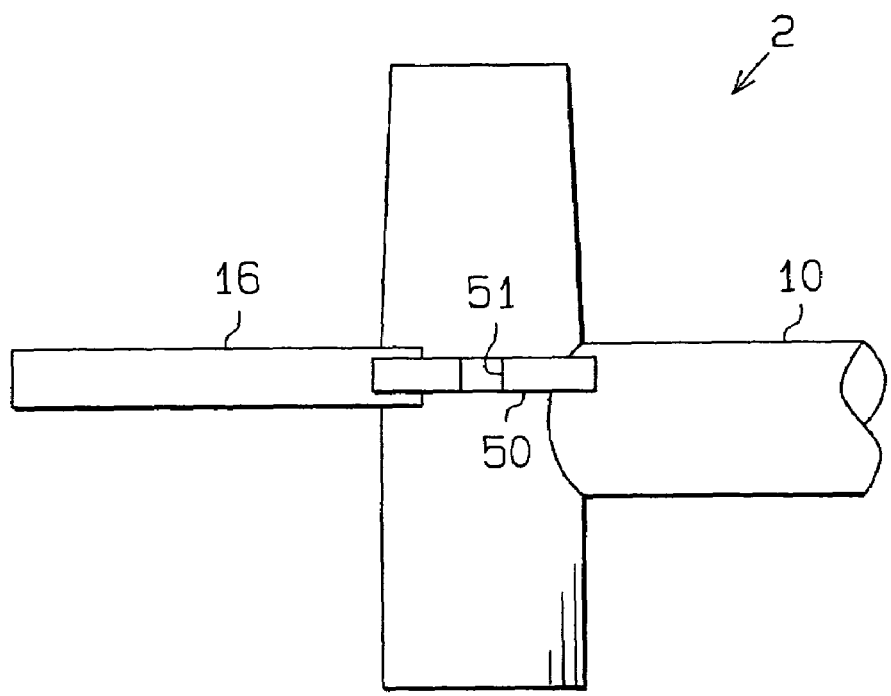
FIG. 10B is a side view showing the pivot holder of FIG. 10A.

In the first embodiment, the engaging grooves (serving as the first side engaging portions) 24 are formed in the pivot holder 2, and the projections (second side engaging portions) 28 formed in the water shield cap 20 are engaged with the engaging grooves 24. However, the first side engaging portion(s) can be formed in any other part as long as the water shield cap 20 can be secured to the pivot holder 2 in such a manner that the movements of the water shield cap 20 in the axial direction and in the circumferential direction are limited. For example, as shown in FIGS. 10A and 10B, a flange 50, which extends radially outward, can be provided in the pivot holder 2, and notches (serving as holder side engaging portions) 51 can be recessed radially inward in the flange 50. The projections 28 of the water shield cap 20 can be engaged with the notches 51 of the flange 50 to limit movements of the water shield cap 20 in the axial direction and in the circumferential direction.

In the first embodiment, the engaging grooves 24 are formed in the pivot holder 2, and the base sections 26, which have the projections 28, are formed in the water shield cap 20. Alternatively, projections, which serve as the holder side engaging portions, can be formed in the pivot holder 2, and corresponding through holes, which serve as the cap side engaging portions, can be formed in the base sections 26 of the water shield cap 20 and can be engaged with the projections of the pivot holder 2.

In the first embodiment, the water receiver 27 is formed into the generally circular form. However, the shape of the water receiver 27 can be changed to any suitable shape as long as it can effectively receive water droplets when the water droplets enter through the pivot hole 19b.

In the first embodiment, the two engaging base sections 26 and the two engaging grooves 24 are provided. However, as long as the movements of the water shield cap 20 in the axial direction and in the circumferential direction can be restrained, the number of the base sections 26 and the number of the engaging grooves 24 can be changed to any other suitable numbers.

In the second embodiment, the pair of base sections 43 is inserted into the through hole 42 of the securing portion 16. Alternatively, only one base section 43 or more than two base sections 43 can be inserted into the through hole 42.

In the second embodiment, only one through hole 42 is provided in the securing portion 16. However, two or more through holes 42 can be provided in the securing portion 16. In such a case, two or more pairs of base sections 43, which include the projections 44, can be provided in the water shield cap 41 to respectively engage with the through holes 42, so that the engaging force between the water shield cap 41 and the pivot holder 40 can be increased.

In the second embodiment, the through hole 42 is formed in the securing portion 16. However, for example, a flange, which projects radially outward, can be provided in the pivot holder 40, and the through hole 42 can be formed in the flange to engage with the projections 44.

In the first and second embodiments, the angle θ2 of the tubular portion 25 of the water shield cap 20 (41) is set to be greater than the angle θ1 of the tapered portion 23 of the pivot holder 2 (40). However, as long as tight engagement between the pivot holder 2 and the tubular portion 25 of the water shield cap 20 can be achieved, these angles θ1, θ2 can be changed to the identical angle (i.e., θ1=θ2). With this arrangement, the engaging force between the water shield cap 20 (41) and the pivot holder 2 (40) can be further increased to improve sealing therebetween.

Additional advantages and modifications will readily occur to those skilled in the art. The invention in its broader terms is therefore not limited to the specific details, representative apparatus, and illustrative examples shown and described.

What is claimed is:

1. A wiper pivot for a wiper device of a vehicle, which includes at least one wiper, the wiper pivot comprising:
    a pivot shaft that extends through a pivot hole provided in a body of the vehicle and is connected with a corresponding one of the at least one wiper;
    a pivot holder that includes:
    a tubular main body that rotatably supports the pivot shaft therein;
    a securing portion that is integrally formed with the main body and extends from an outer peripheral surface of the main body, wherein the securing portion is secured to the body of the vehicle; and
    at least one holder side engaging portion; and
    a water shield cap that includes:
        a tubular portion that is fitted to the outer peripheral surface of the main body of the pivot holder in an axial direction of the pivot shaft;
        a water receiver that extends radially outward from the tubular portion; and
        at least one cap side engaging portion, each of which is engaged with a corresponding one of the at least one holder side engaging portion, wherein when at least one of the at least one cap side engaging portion is engaged with the corresponding one of the at least one holder side engaging portion, axial movement of the water shield cap relative to the pivot holder is limited, wherein:
            the main body of the pivot holder includes a tapered portion, which is tapered toward a distal end of the main body; and
            at least a portion of an inner peripheral surface of the tubular portion of the water shield cap is tapered toward a distal end of the tubular portion and is engaged with the tapered portion of the main body of the pivot holder to substantially fluid tightly seal between the water shield cap and the pivot holder.

2. The wiper pivot according to claim 1, wherein:
    the at least one of the at least one holder side engaging portion includes one of:
        a recess that is radially recessed; and
        a projection that radially projects; and
    the corresponding one of the at least one cap side engaging portion, which is engaged with the at least one of the at least one holder side engaging portion, includes the other one of the recess and the projection.

3. The wiper pivot according to claim 1, wherein when the at least one of the at least one cap side engaging portion is engaged with the corresponding one of the at least one holder side engaging portion, rotational movement of the water shield cap relative to the pivot holder is also limited.

4. The wiper pivot according to claim 1, wherein a material of the water shield cap is different from a material of the pivot holder.

5. The wiper pivot according to claim 1, wherein the water shield cap is made of a resin material.

6. The wiper pivot according to claim 1, wherein:
    the water receiver of the water shield cap includes a drain hole; and
    the water shield cap further includes a drain pipe, which is integrally formed with the water receiver and extends from the drain hole of the water receiver in a direction generally parallel to the axial direction of the pivot shaft.

7. A wiper pivot for a wiper device of a vehicle, which includes at least one wiper, the wiper pivot comprising:
    a pivot shaft that extends through a pivot hole provided in a body of the vehicle and is connected with a corresponding one of the at least one wiper;
    a pivot holder that includes:
        a tubular main body that rotatably supports the pivot shaft therein;
        a securing portion that is integrally formed with the main body and extends from an outer peripheral surface of the main body, wherein the securing portion is secured to the body of the vehicle; and
        at least one holder side engaging portion; and
    a water shield cap that includes:
        a tubular portion that is fitted to the outer peripheral surface of the main body of the pivot holder in an axial direction of the pivot shaft;
        a water receiver that extends radially outward from the tubular portion; and
        at least one cap side engaging portion, each of which is engaged with a corresponding one of the at least one holder side engaging portion, wherein when at least one of the at least one cap side engaging portion is engaged with the corresponding one of the at least one holder side engaging portion, axial movement of the water shield cap relative to the pivot holder is limited, wherein:
            the at least one of the at least one holder side engaging portion includes one of a through hole and a projection; and
            the corresponding one of the at least one cap side engaging portion, which is engaged with the at least one of the at least one holder side engaging portion, includes the other one of the through hole and the projection.

8. The wiper pivot according to claim 7, wherein:
    the at least one holder side engaging portion includes an engaging through hole, which penetrates through the securing portion of the pivot holder in a direction generally parallel to the axial direction of the pivot shaft; and the at least one cap side engaging portion extends in a direction generally parallel to the axial direction of the pivot shaft through the corresponding engaging through hole and is engaged with a bottom surface of the securing portion, so that the axial movement and also rotational movement of the water shield cap relative to the pivot holder are limited.

9. The wiper pivot according to claim 7, wherein a material of the water shield cap is different from a material of the pivot holder.

10. The wiper pivot according to claim 7, wherein the water shield cap is made of a resin material.

11. The wiper pivot according to claim 7, wherein:

the water receiver of the water shield cap includes a drain hole; and the water shield cap further includes a drain pipe, which is integrally formed with the water receiver and extends from the drain hole of the water receiver in a direction generally parallel to the axial direction of the pivot shaft.

12. A wiper pivot for a wiper device of a vehicle, which includes at least one wiper, the wiper pivot comprising:

a pivot shaft that extends through a pivot hole provided in a body of the vehicle and is connected with a corresponding one of the at least one wiper;

a pivot holder that includes:
  a tubular main body that rotatably supports the pivot shaft therein;
  a securing portion that is integrally formed with the main body and extends from an outer peripheral surface of the main body, wherein the securing portion is secured to the body of the vehicle; and
  at least one holder side engaging portion; and a water shield cap that includes:
  a tubular portion that is fitted to the outer peripheral surface of the main body of the pivot holder in an axial direction of the pivot shaft;
  a water receiver that extends radially outward from the tubular portion; and
  at least one cap side engaging portion, each of which is engaged with a corresponding one of the at least one holder side engaging portion, wherein when at least one of the at least one cap side engaging portion is engaged with the corresponding one of the at least one holder side engaging portion, axial movement of the water shield cap relative to the pivot holder is limited, wherein:
    the at least one holder side engaging portion includes first and second holder side engaging portions;
    the at least one cap side engaging portion includes first and second cap side engaging portions;
    the first holder side engaging portion and the first cap side engaging portion are engaged with one another to limit the axial movement of the water shield cap relative to the pivot holder; and
    the second holder side engaging portion and the second cap side engaging portion are engaged with one another to limit rotational movement of the water shield cap relative to the pivot holder;
    the first holder side engaging portion includes at least three walls extending outwardly from the main body that cooperate together to define an engaging recess; and
    the first cap side engaging portion includes a projection, which projects radially inward and is engaged with the engaging recess of the first holder side engaging portion to limit the axial movement and also rotational movement of the water shield cap relative to the pivot holder.

13. The wiper pivot according to claim 12, wherein one of the at least three walls is positioned on a pivot hole side of the engaging recess and has an external surface that is slanted in a direction away from a distal end of the main body.

14. The wiper pivot according to claim 12, wherein:

the second holder side engaging portion includes two projecting walls that are generally parallel to one another and project in a direction generally parallel to the axial direction of the pivot shaft; and the second cap side engaging portion projects in a direction generally parallel to the axial direction of the pivot shaft and is axially received between the projecting walls of the second holder side engaging portion to limit the rotational movement of the water shield cap relative to the pivot holder.

15. A wiper device for a vehicle, the wiper device comprising:

a wiper motor;

a link mechanism connected to the wiper motor;

at least one wiper driven by the wiper motor through the link mechanism; and at least one wiper pivot, each of which is placed between the link mechanism and a corresponding one of the at least one wiper to rotatably support the corresponding one of the at least one wiper, wherein each wiper pivot includes:
  a pivot shaft that extends through a pivot hole of a body of the vehicle and is connected with the corresponding one of the at least one wiper;
  a pivot holder that includes:
    a tubular main body that rotatably supports the pivot shaft therein;
    a securing portion that is integrally formed with the main body and extends from an outer peripheral surface of the main body, wherein the securing portion is secured to the body of the vehicle; and
    at least one holder side engaging portion; and
  a water shield cap that includes:
    a tubular portion that is fitted to the outer peripheral surface of the main body of the pivot holder in an axial direction of the pivot shaft;
    a water receiver that extends radially outward from the tubular portion; and
    at least one cap side engaging portion, each of which is engaged with a corresponding one of the at least one holder side engaging portion, wherein when at least one of the at least one cap side engaging portion is engaged with the corresponding one of the at least one holder side engaging portion, axial movement of the water shield cap relative to the pivot holder is limited, wherein:
      the main body of the pivot holder includes a tapered portion, which is tapered toward a distal end of the main body; and at least a portion of an inner peripheral surface of the tubular portion of the water shield cap is tapered toward a distal end of the tubular portion and is engaged with the tapered portion of the main body of the pivot holder to substantially fluid tightly seal between the water shield cap and the pivot holder.

16. A wiper device for a vehicle, the wiper device comprising:

a wiper motor;

a link mechanism connected to the wiper motor;

at least one wiper driven by the wiper motor through the link mechanism; and at least one wiper pivot, each of which is placed between the link mechanism and a corresponding one of the at least one wiper to rotatably support the corresponding one of the at least one wiper, wherein each wiper pivot includes:

a pivot shaft that extends through a pivot hole of a body of the vehicle and is connected with the corresponding one of the at least one wiper;

a pivot holder that includes:

a tubular main body that rotatably supports the pivot shaft therein;

a securing portion that is integrally formed with the main body and extends from an outer peripheral surface of the main body, wherein the securing portion is secured to the body of the vehicle; and at least one holder side engaging portion; and a water shield cap that includes:

a tubular portion that is fitted to the outer peripheral surface of the main body of the pivot holder in an axial direction of the pivot shaft;

a water receiver that extends radially outward from the tubular portion; and at least one cap side engaging portion, each of which is engaged with a corresponding one of the at least one holder side engaging portion, wherein when at least one of the at least one cap side engaging portion is engaged with the corresponding one of the at least one holder side engaging portion, axial movement of the water shield cap relative to the pivot holder is limited, wherein:

the at least one holder side engaging portion includes first and second holder side engaging portions;

the at least one cap side engaging portion includes first and second cap side engaging portions;

the first holder side engaging portion and the first cap side engaging portion are engaged with one another to limit the axial movement of the water shield cap relative to the pivot holder; and the second holder side engaging portion and the second cap side engaging portion are engaged with one another to limit rotational movement of the water shield cap relative to the pivot holder;

the first holder side engaging portion includes at least three walls extending outwardly from the main body that cooperate together to define an engaging recess; and the first cap side engaging portion includes a projection, which projects radially inward and is engaged with the engaging recess of the first holder side engaging portion to limit the axial movement and also rotational movement of the water shield cap relative to the pivot holder.

* * * * *